US010180617B1

(12) United States Patent
     Takei (10) Patent No.: US 10,180,617 B1
(45) Date of Patent: Jan. 15, 2019

(54) OPTICAL MODULATING APPARATUS AND METHOD FOR CONTROLLING OPTICAL MODULATOR

(71) Applicant: NEC CORPORATION, Tokyo (JP)

(72) Inventor: Daisuke Takei, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/821,055

(22) Filed: Nov. 22, 2017

(30) Foreign Application Priority Data

Nov. 28, 2016 (JP) ................................ 2016-229903

(51) Int. Cl.
| | |
|---|---|
| *G02F 1/313* | (2006.01) |
| *G02F 1/01* | (2006.01) |
| *G02F 1/21* | (2006.01) |
| *G02F 1/225* | (2006.01) |

(52) U.S. Cl.
CPC .......... *G02F 1/3136* (2013.01); *G02F 1/0123* (2013.01); *G02F 1/225* (2013.01); *G02F 2001/212* (2013.01); *G02F 2203/50* (2013.01)

(58) Field of Classification Search
CPC ......................... G02F 1/0123; G02F 2001/212
See application file for complete search history.

(56) References Cited

U.S. PATENT DOCUMENTS

| | | | | |
|---|---|---|---|---|
| 9,063,355 B2 * | 6/2015 | Akashi | .................. | G02F 1/0123 |
| 9,344,194 B2 * | 5/2016 | Kim | .................... | H04B 10/5053 |

FOREIGN PATENT DOCUMENTS

JP     2013-167703     8/2013

\* cited by examiner

*Primary Examiner* — Omar R Rojas
(74) *Attorney, Agent, or Firm* — Finnegan, Henderson, Farabow, Garrett & Dunner, L.L.P.

(57) ABSTRACT

An optical modulating apparatus according to an example aspect of the invention includes an optical modulator including a plurality of Mach-Zehnder interferometers each of which including a pair of waveguides; a storage configured to store waveguide characteristic information indicating a relationship between a bias electrical signal applied to the waveguide and an optical characteristic of the waveguide; a calculation part configured to calculate, depending on a variation in the bias electrical signal applied to the waveguide included in one Mach-Zehnder interferometer of the plurality of Mach-Zehnder interferometers, a correction electrical signal applied to the waveguide included in the other Mach-Zehnder interferometer based on the waveguide characteristic information; and a signal application part configured to apply the correction electrical signal to the waveguide included in the other Mach-Zehnder interferometer.

20 Claims, 7 Drawing Sheets

|  | INITIAL STATE | AFTER CHANGE | AFTER AUTOMATIC CORRECTION |
|---|---|---|---|
| APPLIED VOLTAGE [V] | | | |
| IP1 | 4 V | → 6.1 V | 6.1 V |
| IP2 | 4 V | → 6.1 V | 6.1 V |
| QP1 | 2 V | 2 V | 2 V |
| QP2 | 7 V | 7 V | 7 V |
| MP1 | 6.5 V | 6.5 V | → 5 V |
| MP2 | 2.2 V | 2.2 V | → 2.5 V |
| PARAMETER | | | |
| I-Power | −3.0 dBm | −3.5 dBm | −3.0 dBm |
| Q-Power | −3.0 dBm | −3.0 dBm | −3.0 dBm |
| IQ POWER DIFFERENCE | 0.0 dBm | 0.5 dBm | 0.0 dBm |
| I PHASE | 0.00 rad | 0.69 rad | 0.12 rad |
| Q PHASE | 1.57 rad | 1.57 rad | 1.70 rad |
| IQ PHASE DIFFERENCE | 90° | 51° | 90° |

OPTICAL MODULATING APPARATUS AND METHOD FOR CONTROLLING OPTICAL MODULATOR

This application is based upon and claims the benefit of priority from Japanese Patent Application No. 2016-229903, filed on Nov. 28, 2016, the disclosure of which is incorporated herein in its entirety by reference.

TECHNICAL FIELD

The present invention relates to optical modulating apparatuses and methods for controlling an optical modulator and, in particular, relates to an optical modulating apparatus with a Mach-Zehnder interferometer and a method for controlling an optical modulator.

BACKGROUND ART

In the field of high-speed optical communications, an optical modulator (LN optical modulator) is currently used that uses an electro-optical effect of dielectric material consisting primarily of lithium niobate (LiNbO$_3$) and the like. In order to make an optical modulator still smaller, a semiconductor optical modulator is starting to become common that uses an electroabsorption effect of semiconductors. An example of such semiconductor optical modulator is described in Japanese Patent Application Laid-Open Publication No. 2013-167703.

The related semiconductor optical modulator described in Japanese Patent Application Laid-Open Publication No. 2013-167703 is a Mach-Zehnder type optical modulator in which electrical signals are converted into optical signals, and includes a main Mach-Zehnder interferometer, a measurement unit, and a control unit.

The main Mach-Zehnder interferometer includes a first arm and a second arm that branch off from a main input optical path at one end, conjoin at the other end, and are connected to a main output optical path. The phase of the light propagating through each of the first arm and the second arm is varied depending on a voltage applied to a corresponding electrode of a first electrode and a second electrode, and the power of the light is attenuated.

The control unit controls the voltage applied to one of the first electrode and the second electrode based on the power of the light measured by the measurement unit so that the power of the light propagating through the first arm may become equal to the power of the light propagating through the second arm. The control unit controls the voltage applied to the other one of the first electrode and the second electrode according to an electrical signal.

It is said that, according to the related semiconductor optical modulator, the above-described configuration makes it possible to improve an extinction ratio of the light signal propagating through the main output optical path because the power of the light propagating through the first arm becomes equal to the power of the light propagating through the second arm.

SUMMARY

An example object of the invention is to provide an optical modulating apparatus and a method for controlling an optical modulator which can solve the problem that complex control is required to optimize the signal characteristics of an optical modulator with a plurality of Mach-Zehnder interferometers.

An optical modulating apparatus according to an example aspect of the invention includes an optical modulator including a plurality of Mach-Zehnder interferometers each of which including a pair of waveguides; a storage configured to store waveguide characteristic information indicating a relationship between a bias electrical signal applied to the waveguide and an optical characteristic of the waveguide; a calculation part configured to calculate, depending on a variation in the bias electrical signal applied to the waveguide included in one Mach-Zehnder interferometer of the plurality of Mach-Zehnder interferometers, a correction electrical signal applied to the waveguide included in the other Mach-Zehnder interferometer based on the waveguide characteristic information; and a signal application part configured to apply the correction electrical signal to the waveguide included in the other Mach-Zehnder interferometer.

A method for controlling an optical modulator according to an example aspect of the invention, the optical modulator including a plurality of Mach-Zehnder interferometers including a pair of waveguides, includes obtaining waveguide characteristic information indicating a relationship between a bias electrical signal applied to the waveguide and an optical characteristic of the waveguide; calculating a correction electrical signal based on the waveguide characteristic information depending on a variation in the bias electrical signal applied to the waveguide included in one Mach-Zehnder interferometer of the plurality of Mach-Zehnder interferometers, the correction electrical signal being applied to the waveguide included in other Mach-Zehnder interferometer; and applying the correction electrical signal to the waveguide included in the other Mach-Zehnder interferometer.

BRIEF DESCRIPTION OF THE DRAWINGS

Exemplary features and advantages of the present invention will become apparent from the following detailed description when taken with the accompanying drawings in which.

EXAMPLE EMBODIMENT

An example embodiment of the present invention will be described below with reference to the drawings.

First Example Embodiment

Figure 1:
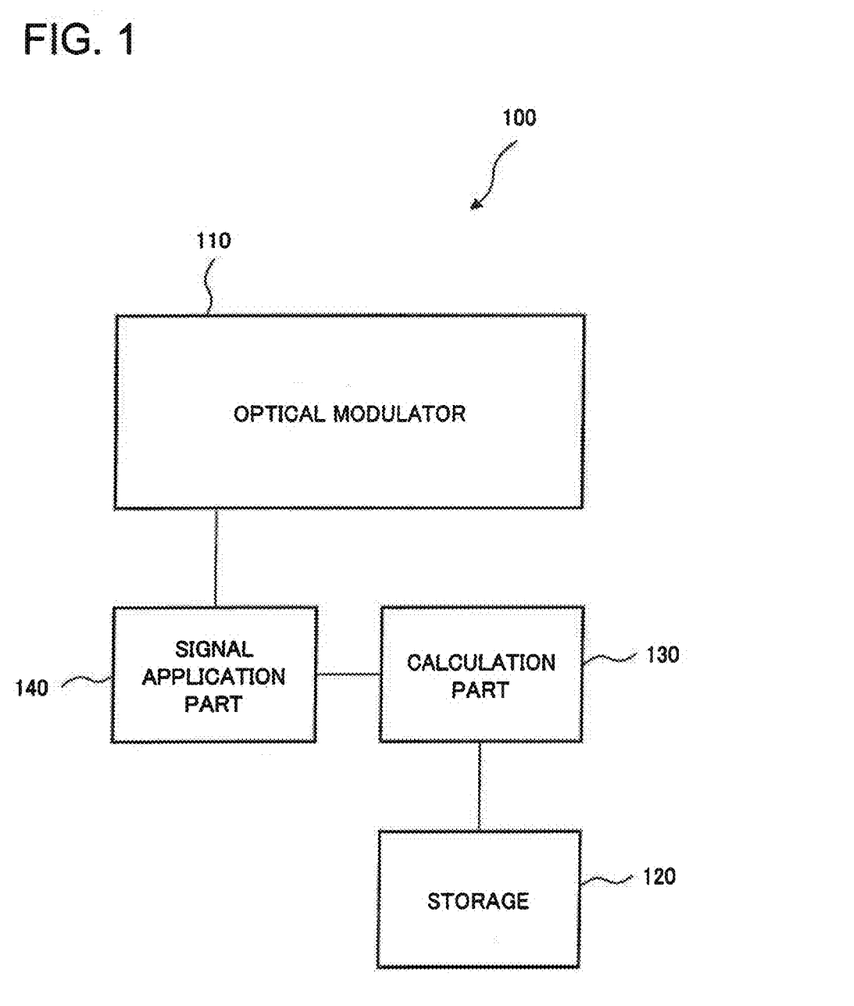
FIG. 1 is a block diagram illustrating a configuration of an optical modulating apparatus according to a first example embodiment of the present invention.

FIG. 1 is a block diagram illustrating a configuration of an optical modulating apparatus 100 according to a first example embodiment of the present invention. The optical modulating apparatus 100 according to the present example embodiment includes an optical modulator 110, a storage (storage means) 120, a calculation part (calculation means) 130, and a signal application part (signal application means) 140.

The optical modulator 110 includes a plurality of Mach-Zehnder interferometers (Mach-Zehnder interfering means) each of which including a pair of waveguides. The storage 120 stores waveguide characteristic information indicating a relationship between a bias electrical signal applied to the waveguide and an optical characteristic of the waveguide.

The calculation part 130, depending on a variation in the bias electrical signal applied to the waveguide included in one Mach-Zehnder interferometer of the plurality of Mach-Zehnder interferometers, calculates a correction electrical signal applied to the waveguide included in the other Mach-Zehnder interferometer based on the waveguide characteristic information. The signal application part 140 applies the correction electrical signal to the waveguide included in the other Mach-Zehnder interferometer.

The above-described configuration, according to the optical modulating apparatus 100 of the example embodiment, causes the correction electrical signal to be applied to the waveguide included in the other Mach-Zehnder interferometer depending on a variation in the bias electrical signal applied to the waveguide included in one Mach-Zehnder interferometer. This makes it possible to keep an adjusting parameter of the other Mach-Zehnder interferometer constant even though an adjusting parameter of the one Mach-Zehnder interferometer is varied to optimize the signal characteristic of the optical modulator 110. Consequently, it becomes possible to control independently each adjusting parameter of the optical modulator 110. That is to say, the optical modulating apparatus 100 according to the example embodiment makes it possible to optimize the signal characteristic of the optical modulator with a plurality of Mach-Zehnder interferometers by simple control.

Next, the operation of the optical modulating apparatus 100 according to the present example embodiment will be described.

If a parameter to be adjusted is selected from among the adjusting parameters used for optimizing the modulating operation of the optical modulator 110, a bias electrical signal (an applied voltage) for an MZ (Mach-Zehnder) interferometer to be a controlled object is varied. At this time, the calculation part 130 calculates an optical characteristic variation of the waveguide due to the variation in the bias electrical signal based on the waveguide characteristic information. The phase and the loss of the guided light propagating through the waveguide can be used as the optical characteristic.

Next, the calculation part 130 calculates a characteristic variation of the output light of one Mach-Zehnder interferometer (Mach-Zehnder interfering means) due to the optical characteristic variation of the waveguide. The calculation part 130 determines the correction electrical signal based on the waveguide characteristic information so as to cancel the characteristic variation.

That is to say, the calculation part 130 calculates each parameter variation using the relationship between the loss of the waveguide and the applied voltage, the relationship between the phase variation and the applied voltage (waveguide characteristic information), and a theoretical formula of the MZ type interferometer (see formula (3)). The calculation part 130 calculates backward the correction electrical signal (correction voltage) to be applied to each MZ interferometer so as to correct a variation in a parameter other than the parameter to be adjusted. To apply the bias voltage based on the calculation result makes it possible to keep constant a parameter other than the parameter to be adjusted.

Thus, according to the optical modulating apparatus 100 of the present example embodiment, it is possible to control the optical modulator 110 optimally by simple control because it becomes possible to adjust the parameters of the optical modulator 110 independently. In particular, with an MZ interferometer type optical modulator such as a semiconductor optical modulator in which not only the phase but also the amplitude of the propagation light varies by applying the voltage, it becomes possible to achieve the optimum operation by simple control.

Next, a method for controlling an optical modulator according to the present example embodiment will be described. The method for controlling an optical modulator according to the present example embodiment is a method for controlling the optical modulator with a plurality of Mach-Zehnder interferometers including a pair of waveguides.

In the method for controlling an optical modulator according to the present example embodiment, first, waveguide characteristic information is obtained that indicates a relationship between a bias electrical signal applied to the waveguide and an optical characteristic of the waveguide. Depending on a variation in the bias electrical signal applied to a waveguide included in one Mach-Zehnder interferometer of the plurality of Mach-Zehnder interferometers, a correction electrical signal applied to a waveguide included in the other Mach-Zehnder interferometer is calculated based on the waveguide characteristic information. The correction electrical signal is applied to the waveguide included in the other Mach-Zehnder interferometer.

Here, the above-mentioned optical characteristic includes the phase and the loss of the guided light propagating through the waveguide.

The calculating the correction electrical signal can be configured to include the following steps. Namely, in the calculating the correction electrical signal, first, an optical characteristic variation of the waveguide due to the variation in the bias electrical signal is calculated based on the waveguide characteristic information. Next, a characteristic variation of the output light of one Mach-Zehnder interferometer due to the optical characteristic variation of the waveguide is calculated. The correction electrical signal is determined based on the waveguide characteristic information so as to cancel the characteristic variation.

As described above, according to the optical modulating apparatus 100 and the method for controlling the optical modulator of the present example embodiment, it is possible to optimize the signal characteristic of the optical modulator with a plurality of Mach-Zehnder interferometers by simple control.

Second Example Embodiment

Figure 2:
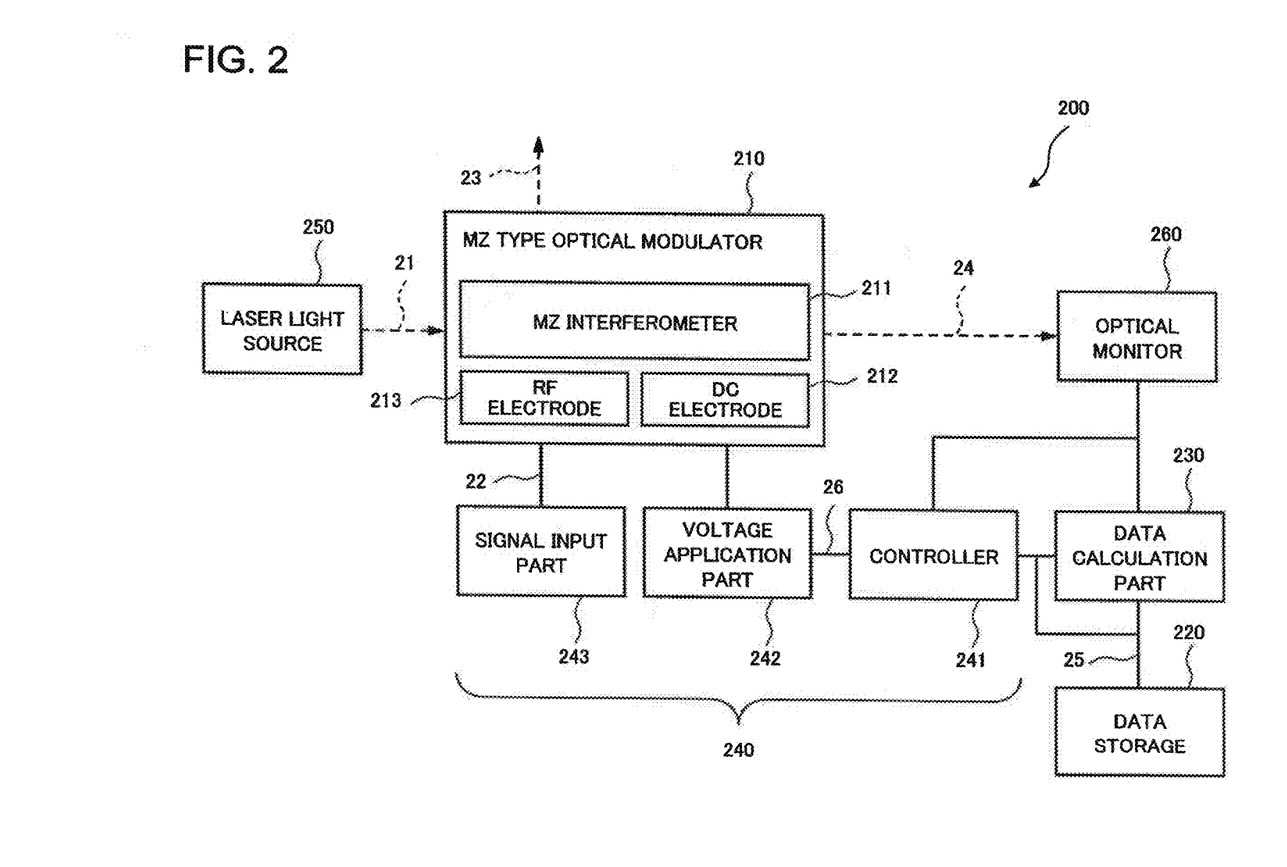
FIG. 2 is a block diagram illustrating a configuration of an optical modulating apparatus according to a second example embodiment of the present invention.

Next, a second example embodiment of the present invention will be described. FIG. 2 is a block diagram illustrating a configuration of an optical modulating apparatus 200 according to the second example embodiment of the present invention. The optical modulating apparatus 200 according to the present example embodiment includes an MZ type optical modulator (optical modulator) 210, a data storage (storage means) 220, a data calculation part (calculation means) 230, and a signal application part (signal application means) 240.

The MZ type optical modulator 210 includes an MZ interferometer 211 that is composed of a plurality of Mach-Zehnder interferometers (Mach-Zehnder interfering means) including a pair of waveguides. The data storage 220 stores waveguide characteristic information indicating a relationship between a bias electrical signal applied to the waveguide and an optical characteristic of the waveguide.

The data calculation part 230, depending on a variation in the bias electrical signal applied to a waveguide included in one Mach-Zehnder interferometer of the plurality of Mach-Zehnder interferometers, calculates a correction electrical signal applied to a waveguide included in the other Mach-Zehnder interferometer based on the waveguide characteristic information. The signal application part 240 applies the correction electrical signal to the waveguide included in the other Mach-Zehnder interferometer.

The above-described configuration is similar to that of the optical modulating apparatus 100 according to the first example embodiment. The optical modulating apparatus 200 according to the present example embodiment further includes a laser light source 250 and an optical monitor (monitor means) 260. The laser light source 250 emits a laser carrier wave to be inputted into the MZ type optical modulator 210. The optical monitor 260 monitors part of the output light of the MZ type optical modulator 210 and outputs a monitor signal.

Here, the data calculation part 230 generates the waveguide characteristic information based on the monitor signal and stores the generated waveguide characteristic information in the data storage 220.

The signal application part 240 is configured to include a voltage application part (direct current electrical signal application means) 242, a signal input part (data signal input means) 243, and a controller (control means) 241. Here, the voltage application part 242 applies a direct current electrical signal including the bias electrical signal and the correction electrical signal to the waveguide. The signal input part 243 applies a data electrical signal to the waveguide. The controller 241 controls the voltage application part 242 so as to apply the bias electrical signal to the waveguide included in one Mach-Zehnder interferometer and apply the correction electrical signal to the waveguide included in the other Mach-Zehnder interferometer.

As mentioned above, the MZ type optical modulator 210 includes the MZ interferometer 211 composed of the plurality of Mach-Zehnder interferometers. The MZ interferometer 211 can be configured to include a first Mach-Zehnder interferometer (first Mach-Zehnder interfering means), a second Mach-Zehnder interferometer (second Mach-Zehnder interfering means), and a third Mach-Zehnder interferometer (third Mach-Zehnder interfering means).

Here, the first Mach-Zehnder interferometer includes a first waveguide and a second waveguide. The second Mach-Zehnder interferometer includes a third waveguide and a fourth waveguide. The third Mach-Zehnder interferometer includes a fifth waveguide to guide first interfering light output from the first Mach-Zehnder interferometer and a sixth waveguide to guide second interfering light output from the second Mach-Zehnder interferometer. At this time, the data storage 220 stores the waveguide characteristic information on each of the first waveguide, the second waveguide, the third waveguide, the fourth waveguide, the fifth waveguide, and sixth waveguide.

The MZ type optical modulator (optical modulator) 210 includes a DC electrode (direct current electrode) 212 and an RF electrode (high-frequency electrode) 213.

Specifically, the first Mach-Zehnder interferometer includes a first high-frequency electrode to apply the data electrical signal to the first waveguide and a first direct current electrode to apply the direct current electrical signal to the first waveguide. The first Mach-Zehnder interferometer further includes a second high-frequency electrode to apply the data electrical signal to the second waveguide and a second direct current electrode to apply the direct current electrical signal to the second waveguide.

The second Mach-Zehnder interferometer includes a third high-frequency electrode to apply the data electrical signal to the third waveguide and a third direct current electrode to apply the direct current electrical signal to the third waveguide. The second Mach-Zehnder interferometer further includes a fourth high-frequency electrode to apply the data electrical signal to the fourth waveguide and a fourth direct current electrode to apply the direct current electrical signal to the fourth waveguide.

The third Mach-Zehnder interferometer includes a fifth direct current electrode to apply the direct current electrical signal to the fifth waveguide and a sixth direct current electrode to apply the direct current electrical signal to the sixth waveguide.

Next, the operation of the optical modulating apparatus 200 according to the present example embodiment will be described.

Input light 21 is inputted into the MZ type optical modulator 210 from the laser light source 250. The voltage application part 242 applies a direct-current voltage to the DC electrode 212. The MZ type optical modulator 210 modulates the input light 21 with an input signal 22 supplied to the RF electrode 213 from the signal input part 243 and outputs output light 23. The optical monitor 260 monitors branched light 24 obtained by branching part of the output light.

In the following description, a case will be described in which the MZ type optical modulator 210 has a configuration similar to that of a dual parallel MZ type optical modulator 300 illustrated in FIG. 5. That is to say, the MZ type optical modulator 210 includes an MZ interferometer (MZ_I) corresponding to an I-component (in-phase component) as the first Mach-Zehnder interferometer and an MZ interferometer (MZ_Q) corresponding to a Q-component (quadrature phase component) as the second Mach-Zehnder interferometer. The MZ type optical modulator 210 further includes an MZ interferometer (MZ_M) that adjusts a phase difference between the I-component and the Q-component as the third Mach-Zehnder interferometer.

Figure 7:
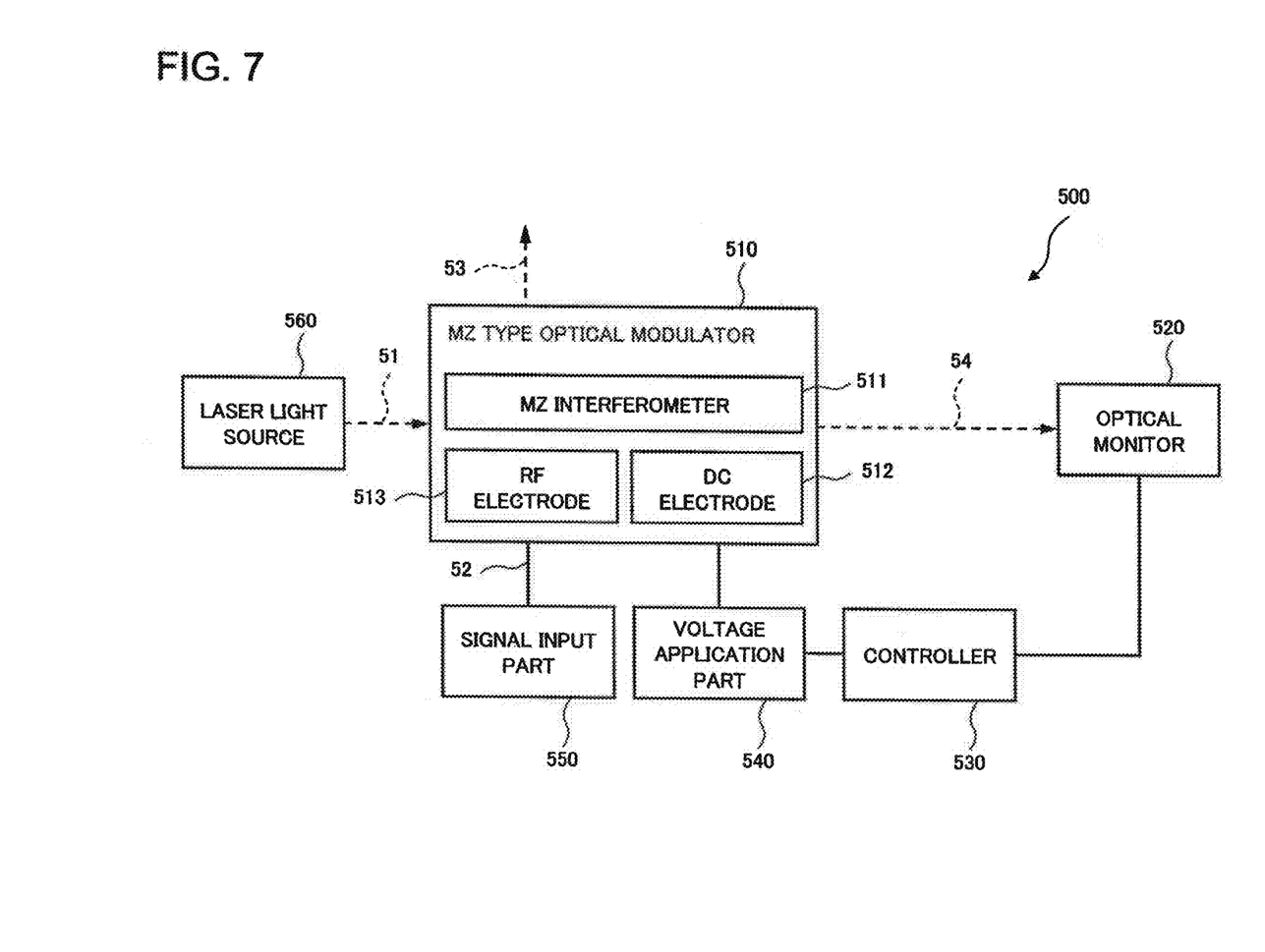
FIG. 7 is a block diagram illustrating a configuration of a related optical modulating apparatus with an MZ type optical modulator.

In this case, it is necessary in a related optical modulating apparatus 500 illustrated in FIG. 7 for a controller 530 to control a voltage application part 540 so as to optimize the above-mentioned three adjusting parameters simultaneously. Here, the three adjusting parameters are (A) an extinction ratio of each MZ interferometer, (B) power balance between the I-component and the Q-component, and (C) a phase difference between the I-component and the Q-component.

In contrast, the optical modulating apparatus 200 according to the present example embodiment has the function of performing a correction so as to change a parameter only that is selected as an object of the adjustment and no to change another parameter.

Specifically, with respect to each waveguide that constitutes the MZ 16 interferometer 211 included in the MZ type optical modulator 210, first, measurement data of the phase versus voltage characteristics and the loss versus voltage characteristics are stored in advance at the time of startup in the data storage 220 as calibration data (waveguide characteristic information) 25. That is to say, at the time of startup, the controller 241 controls the voltage application part 242 to change a voltage to be applied to the DC electrode 212, and obtains by calculation the relationship between the phase variation and the applied voltage and the relationship between the loss and the applied voltage from interference characteristics of monitor signals obtained by the optical monitor 260. The controller 241 can be configured to generate the calibration data (waveguide characteristic information) 25 from the calculation results and store the calibration data 25 in the data storage 220.

Figure 3A:
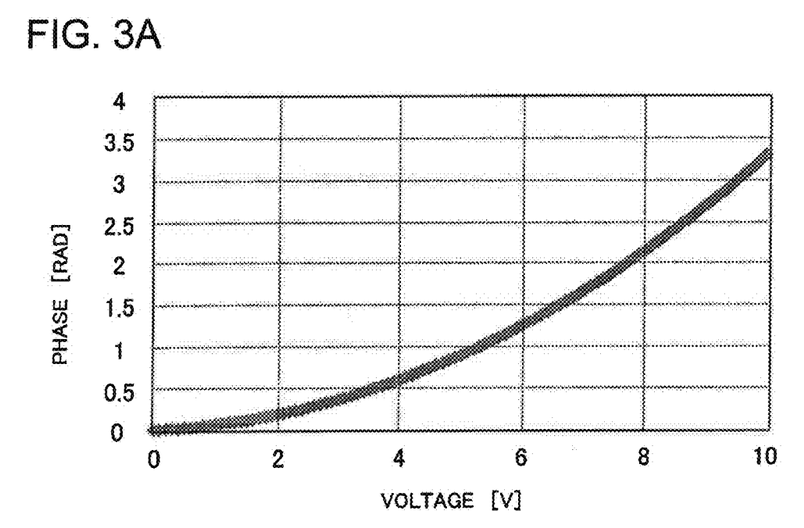
FIG. 3A is a diagram illustrating phase variation of guided light propagating through a waveguide with respect to applied voltage in an MZ type optical modulator included in an optical modulating apparatus according to the second example embodiment of the present invention.
Figure 3B:
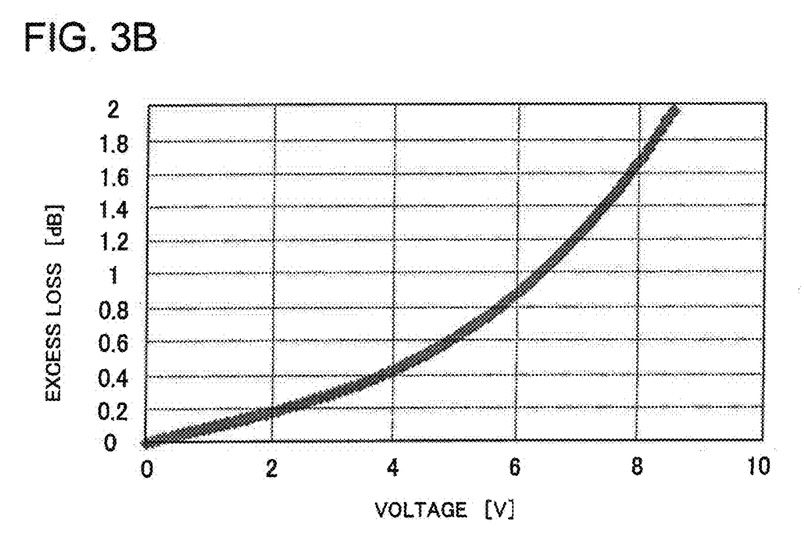
FIG. 3B is a diagram illustrating excess loss of a waveguide with respect to applied voltage in an MZ type optical modulator included in an optical modulating apparatus according to the second example embodiment of the present invention.

FIG. 3A and FIG. 3B illustrate examples of the calibration data. FIG. 3A illustrates phase variation of guided light propagating through a waveguide with respect to applied voltage. FIG. 3B illustrates excess loss of a waveguide with respect to applied voltage.

If the dual parallel MZ type optical modulator 210 is used, the data storage 220 holds, as the calibration data 25, the characteristics of the phase of the propagating light and the applied voltage and the characteristics of the loss and the applied voltage with respect to each pair of waveguides in each of the MZ interferometers (MZ_I, MZ_Q; and MZ_M). In this case, the data storage 220 stores the data for six waveguides with respect to two kinds, phase and loss, that is, twelve kinds of data in total.

The parameter to be adjusted is selected from among three adjusting parameters of the MZ type optical modulator 210. If (A) the extinction ratio of the three adjusting parameters is adjusted, the MZ_I or the MZ_Q is selected as the MZ interferometer to be controlled. If (B) the power balance between the I-component and the Q-component is adjusted, or (C) the phase difference between the I-component and the Q-component is adjusted, the MZ_M is selected as the MZ interferometer to be controlled.

Here, if the adjusting parameter (A) is adjusted, the voltage applied to the MZ_M is corrected so as to keep the adjusting parameters (B) and (C) constant. If the adjusting parameter (B) is adjusted, the adjusting parameter (A) is not affected because only the MZ_M is controlled. Accordingly, the voltage applied to the MZ_M is corrected so as to keep the adjusting parameter (C) constant. If the adjusting parameter (C) is adjusted, the adjusting parameter (A) is not affected because only the MZ_M is controlled. Accordingly, the voltage applied to the MZ_M is corrected so as to keep the adjusting parameter (B) constant.

When changing the voltage applied to the electrode of the MZ interferometer to be controlled, the controller 241 obtains applied voltage information 26 concerning a current applied voltage from the voltage application part 242 and the calibration data 25 stored in the data storage 220, and transmits them to the data calculation part 230.

The data calculation part 230 calculates a phase variation of the propagating light and a loss variation before or after the applied voltage varies in each waveguide included in the MZ interferometer to be controlled. The data calculation part 230 calculates a phase variation and an amplitude variation with respect to the output light of the MZ interferometer to be controlled before or after the applied voltage varies using a theoretical formula of the MZ interferometer (see formula (3)).

The data calculation part 230 further calculates a phase variation and an amplitude variation of the incident light and the output light of the MZ_M that fluctuates due to the variation in the applied voltage of the MZ interferometer to be controlled. The data calculation part 230 calculates backward a correction voltage from the calibration data 25 so as to keep constant an adjusting parameter no to be adjusted. The data calculation part 230 transmits the data of the correction voltage obtained by the back calculation to the controller 241. The controller 241 instructs the voltage application part 242 to apply the correction voltage, and the voltage application part 242 applies the correction voltage to the MZ_M.

Thus, the optical modulating apparatus 200 according to the present example embodiment can keep the parameter not to be adjusted constant in controlling drive conditions of the MZ type optical modulator 210 by changing the parameter to be adjusted. That is to say, when the applied voltage of the MZ interferometer to be controlled is changed, the optical modulating apparatus 200 calculates a correction voltage of the MZ interferometer not to be adjusted (the MZ_M, for example) from the calibration data and automatically performs the correction so as to keep a parameter not to be adjusted constant. Consequently, it becomes possible to control the MZ type optical modulator 210 optimally by changing only the parameter to be adjusted.

Next, the operation of the optical modulating apparatus 200 according to the present example embodiment will be described in further detail. In the following description, a case will be described where the MZ type optical modulator 210 is a semiconductor optical modulator in which not only the phase but also the amplitude of the propagation light varies by applying the voltage. The phase versus voltage characteristics and the loss versus voltage characteristics of the semiconductor modulator are not linear (see FIG. 3A and FIG. 3B). As a result, if a control is performed changing a DC voltage, the variations in phase or loss also depend on the applied voltage before changing it.

In the following description, a case will be specifically described in which (A) the extinction ratio of the adjusting parameters is adjusted using numerical examples described in FIG. 4.

The voltage application part 242 changes the voltage applied to DC electrodes (IP1 and IP2) of the waveguide (MZ_I side) that has the characteristics illustrated in FIG. 3A and FIG. 3B according to the instructions of the controller 241. For example, if the voltage applied to each of the IP1 and the IP2 is changed from 4 [V] to 6.1 [V], the phase of the light propagating through the waveguide changes by only +0.69 [rad], and the loss increases by only +0.5 [dB]. Consequently, the phase (I phase) of the output light of the MZ_I changes by only +0.69 [rad], and the loss of the power (I-Power) of the output light increases by only 0.5 [dBm]. In contrast, the characteristics of the output light of the MZ_Q in which the applied voltage is not changed are constant before and after the voltage applied to the DC electrodes (IP1 and IP2) of the MZ_I has changed.

The data calculation part 230 obtains the applied voltage information 26 from the voltage application part 242 through the controller 241, and obtains the calibration data 25 from the data storage 220 that stores it. The data calculation part 230 calculates the phase variation and the amplitude variation of the light propagating through the waveguide with the DC electrodes (IP1 and IP2) from the applied voltage information 26 and the calibration data 25. The data calculation part 230 calculates the phase variation and the amplitude variation of the output light of the MZ_I from the theoretical formula of the MZ interferometer (see formula (3)).

As mentioned above, when the adjusting parameter (A) is adjusted, the phase and the amplitude of the light inputted into an I-side waveguide of the MZ_M vary if the MZ_I is used as the MZ interferometer to be controlled. As a result, the other adjusting parameters (B) and (C) also vary. So the correction voltage is calculated backward from the calibration data so that the following formulae (4) and (5) may be simultaneously satisfied in order to keep the adjusting parameters (B) and (C) constant before and after the change. Then the correction voltage is applied to DC electrodes (MP1 and MP2) of the MZ_M.

(phase variation in $I$ side waveguide due to $MP1$ correction voltage)+phase variation in $Q$ side waveguide due to $MP2$ correction voltage=phase variation in $MZ\_I$ output light having varied in the adjustment of parameter ($A$)     (4)

(loss variation in $I$ side waveguide due to $MP1$ correction voltage)+loss variation in $Q$ side waveguide due to $MP2$ correction voltage=loss variation in $MZ\_I$ output light having varied in the adjustment of parameter ($A$)     (5)

Figure 4:
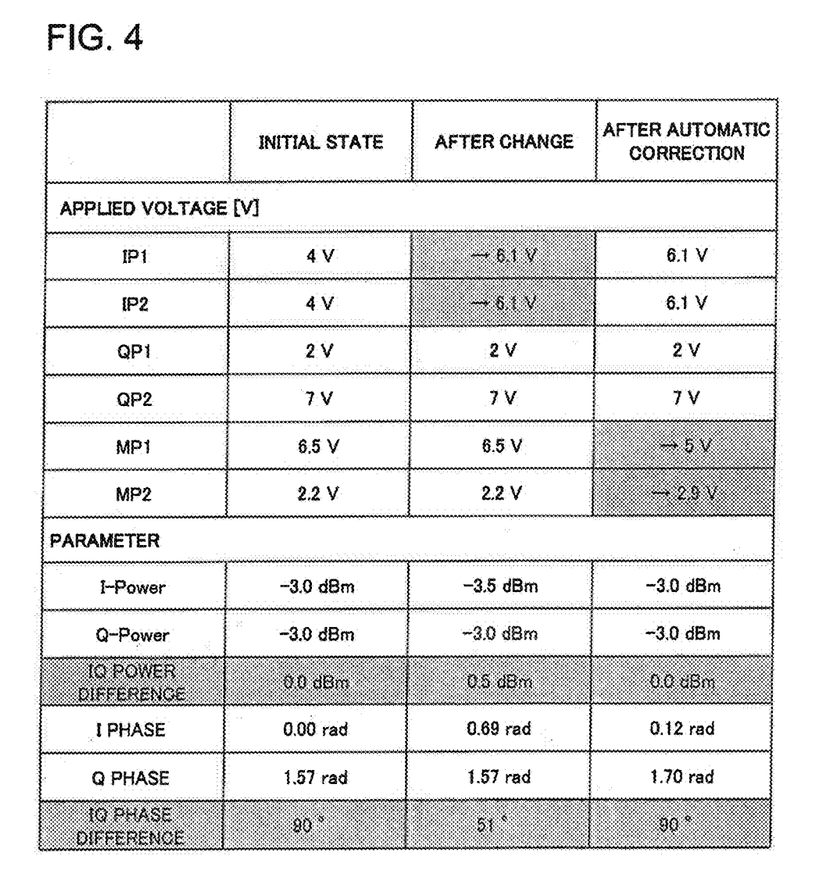
FIG. 4 is a diagram illustrating a numerical example to explain the operation of an optical modulating apparatus according to the second example embodiment of the present invention.

As illustrated by an example in an "initial state" column in FIG. 4, it will be specifically described to adjust the extinction ratio of the MZ_I in a case where the power balance between the I-component and the Q-component (IQ Power difference) and an IQ phase difference are optimized. It is assumed that the voltage applied to the DC electrodes (IP1 and IP2) in the MZ_I is changed from 4 V to 6.1 V in order to adjust the extinction ratio. In this case, the power (I-Power) and the phase (I phase) of the MZ_I output light are changed; consequently, the power balance between the I-component and the Q-component (IQ Power difference) and the IQ phase difference cease to be optimized.

However, according to the optical modulating apparatus 200 of the present example embodiment, the applied voltages (6.5 V and 2.2 V) of the DC electrodes (MP1 and MP2) in the MZ_M are automatically changed to the correction voltages (5 V and 2.9 V). This makes it possible to cancel the variation in the power balance between the 1-component and the Q-component (IQ Power difference) and the IQ phase difference.

Using the numerical values illustrated by an example in FIG. 4, the above formulae (4) can be expressed as the following formulae (4').

+0.57 [rad]($MP1$: 6.5 V to 5 V)+0.13 [rad]($MP2$: 2.2 V to 2.9 V)=−0.69 [rad]($IP1,IP2$: 2.4 V to 6.1 V)     (4')

The above formulae (5) can be expressed as the following formulae (5').

+0.5 [dB]($MP1$: 6.5 V to 5 V)+0 [dB]($MP2$: 2.2 V to 2.9 V)=0.5 [dB]($IP1,IP2$: 2.4 V to 6.1 V)     (5')

The data calculation part 230 transmits to the controller 241 the data of the calculated correction voltage to be applied to the DC electrodes (MP1 and MP2) in the MZ_M. The controller 241 controls the voltage application part 242 so as to apply the correction voltage to the DC electrodes (MP1 and MP2).

These operations make it possible to adjust the adjusting parameter (A) taking into consideration only the MZ interferometer (MZ_I) that is determined to be a controlled object.

When the other adjusting parameter is adjusted, the data calculation part 230 performs a similar calculation, and the correction voltage is automatically applied. This make it possible to control the MZ type optical modulator 210 taking into consideration only the adjustment of the adjusting parameter that is determined to be a the controlled object.

As mentioned above, the optical modulating apparatus 200 of the present example embodiment enables the control to be simplified because each control parameter that directly affects the signal characteristics can be independently optimized. Specifically, for example, at the shipping test of a product in which the optical modulating apparatus 200 is installed (modulator assembly), if a measurement is made by varying voltage drive conditions by which an interference state of an optical modulator is determined, its condition setting becomes easier. Thus, according to the optical modulating apparatus 200 of the present example embodiment, it is possible to optimize the signal characteristic of the optical modulator with a plurality of Mach-Zehnder interferometers by simple control.

If a dual polarization in-phase quadrature-phase (DP-IQ) optical modulator is used as the MZ type optical modulator 210, it also becomes easier to correct the imbalance of power between polarized waves. It is also possible to apply the present example embodiment to the optical modulating apparatus with an automatic voltage control loop of an optical modulator installed; in this case, it is made easier to perform the automatic voltage control.

In the above description, if the phase of the output light of the MZ_I varies due to a variation in the voltage applied to the DC electrodes (IP1 and IP2) in the MZ_I, the phase difference between the I-component and the Q-component of the output light of the MZ type optical modulator 210 is corrected by adjusting the voltage applied to the DC electrodes (MP1 and MP2) in the MZ_M. However, the present example embodiment is not limited to this; it may be configured to change the phase of the output light of the MZ_Q by changing the voltage applied to the DC electrodes (QP1 and QP2) in the MZ interferometer (MZ_Q) corresponding to the Q-component.

If the amplitude of the output light of the MZ_I varies due to a variation in the voltage applied to the DC electrodes (IP1 and IP2) in the MZ_I, the IQ power balance of the output light of the MZ type optical modulator 210 is corrected by adjusting the voltage to be applied to the DC electrodes (MP1 and MP2) in the MZ_M. However, the present example embodiment is not limited to this; it may be configured to change the amplitude of the output light of the MZ_Q by changing the voltage applied to the DC electrodes (QP1 and QP2) in the MZ_Q.

In the present example embodiment, a case has been described in which the MZ type optical modulator 210 is a semiconductor optical modulator. However, the present example embodiment is not limited to this; the present example embodiment can be applied even though the MZ type optical modulator 210 is an optical modulator in which only the phase of the waveguide varies by applying the voltage to the waveguide, for example, an LN optical modulator. In this case, it is unnecessary to control the adjusting parameter (B) because the power balance between the I-component and the Q-component (adjusting parameter (B)) does not vary even though the applied voltage of the DC electrode varies.

The Mach-Zehnder (MZ) type optical modulator used for coherent optical communications includes a DC electrode to apply a direct current (DC) bias by which the drive conditions (loss condition and interference condition) are determined and an RF (radio-frequency) electrode to apply a main signal. In the MZ type optical modulator, the phase of the light propagating through the waveguide is changed by applying a DC voltage or current to a pair of optical waveguides. The power or the phase of the output light can be changed by changing an interference state between a pair of branched light beams.

In an optical modulator using semiconductor material as one described in Japanese Patent Application Laid-Open Publication No. 2013-167703, not only the phase of the propagating light but also the amplitude of it varies because the loss of the waveguide varies due to application of voltage to the optical waveguide.

In the dual parallel MZ type optical modulator including two MZ interferometers corresponding to an in-phase component I and a quadrature-phase component Q, three adjusting parameters corresponding to the modulating operation are used for setting the DC voltage of each MZ interferometer. That is to say, they are (A) the extinction ratio of each MZ interferometer, (B) the power balance between the I-component and the Q-component, and (C) the phase difference between the I-component and the Q-component. The drive conditions for optimizing the signal characteristics of the MZ type optical modulator include three conditions: (a) the extinction ratio is high, (b) the power of the I-component is equal to the power of the Q-component, and (c) the phase difference between the I-component and the Q-component is equal to 90 degrees.

Figure 5:
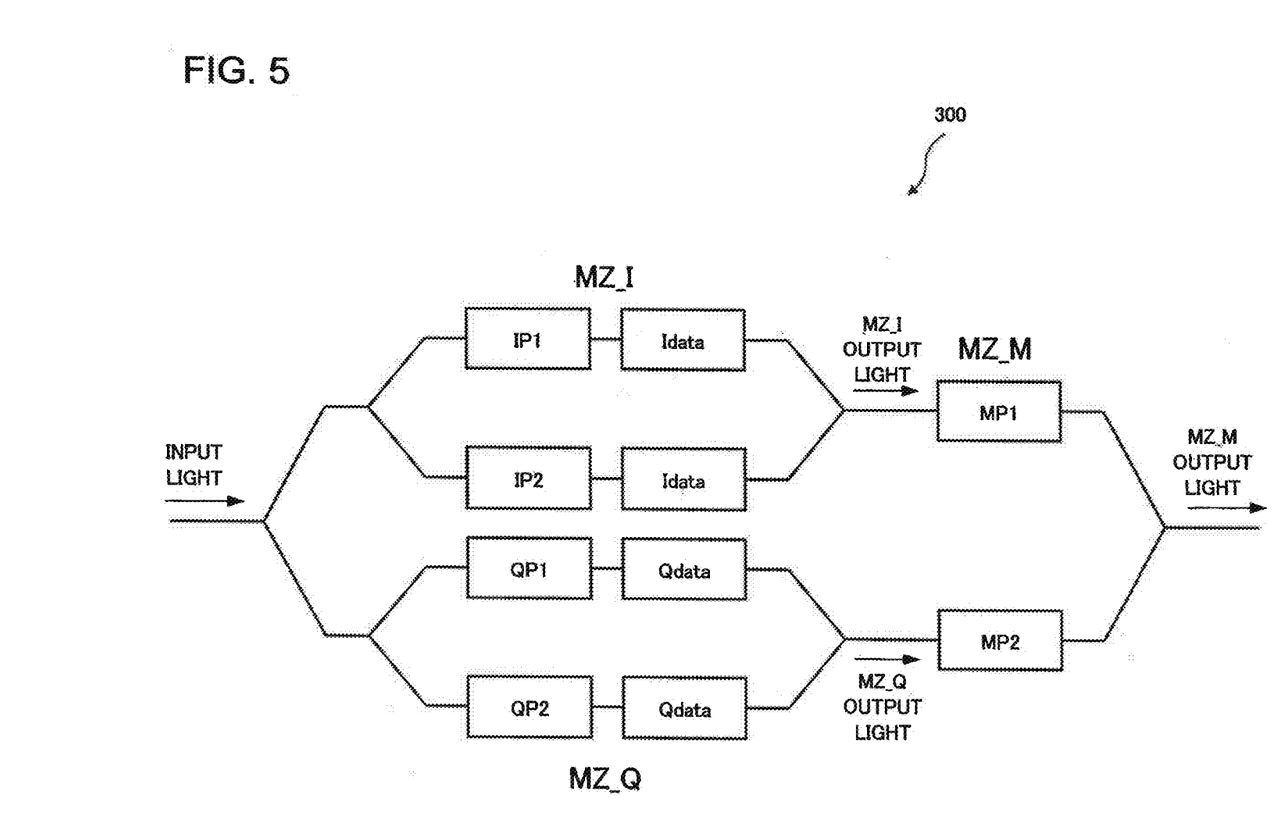
FIG. 5 is a block diagram illustrating a configuration of a dual parallel MZ type optical modulator.

FIG. 5 illustrates the configuration of a dual parallel, MZ type optical modulator 300. The MZ type optical modulator 300 includes an MZ interferometer (MZ_I) corresponding to the I-component, an MZ interferometer (MZ_Q) corresponding to the Q-component, and an MZ interferometer (MZ_M) to adjust the phase difference between the I-component and the Q-component.

If the MZ type optical modulator 300 is an optical modulator in which the loss of the waveguide is constant with applying the voltage, that is, an LN optical modulator, for example, the DC electrodes (IP1, IP2, QP1, and QP2) of the MZ_I and the MZ_Q are used for achieving the drive condition that "(a) the extinction ratio is high" included in the above-mentioned drive conditions. The DC electrodes (MP1 and MP2) of the MZ_M are used for achieving the drive condition that "(c) the phase difference between the I-component and the Q-component is equal to 90 degrees" included in the above-mentioned drive conditions.

In contrast, if the MZ type optical modulator 300 is an optical modulator in which the loss of the waveguide varies due to the voltage, that is, a semiconductor optical modulator, for example, the DC electrodes (MP1 and MP2) of the MZ_M are used for achieving the drive condition (b) that "the power of the I-component is equal to the power of the Q-component" in addition to the drive condition (c).

As illustrated in FIG. 5, in the MZ type optical modulator 300, the output light of the MZ_I and the output light of the MZ_Q are inputted into the MZ_M. Consequently, if the phase, or the phase and the power, of the output light of the MZ_I (MZ_Q) vary due to variation in the applied voltage of the MZ_I (MZ_Q), the interference state between the output light of the MZ_I and the output light of the MZ_Q in the MZ_M varies. That is to say, the above-mentioned adjusting parameters are changed.

As described above, if the applied voltage of one MZ interferometer is changed in order to adjust one of the parameters in the MZ type optical modulator, the above-mentioned three parameters (A), (B), and (C) are affected. As a result, there is the problem that the control of the MZ type optical modulator becomes complex.

The above-mentioned problem will be described in more detail below.

Figure 6:
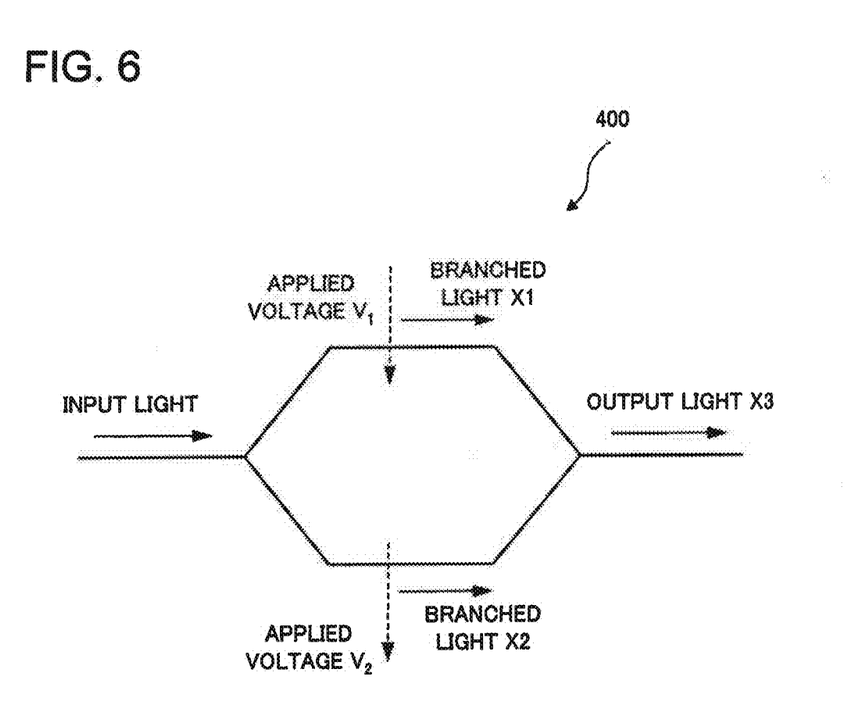
FIG. 6 is a diagrammatic illustration schematically illustrating a configuration of an MZ interferometer.

First, the operation of the MZ interferometer will be described in which the phase and amplitude of the propagating light is changed due to applying the voltage to the waveguide. FIG. 6 schematically illustrates the configuration of a MZ interferometer 400.

As illustrated in FIG. 6, the input light is branched into two beams, which propagate through a pair of waveguides, respectively. The phase and amplitude of the propagating light is changed depending on the voltage applied to each waveguide. That is to say, branched light X1 and branched light X2 propagate through the waveguides to which the voltage V1 and the voltage V2 are applied, respectively, which causes a phase θ and an amplitude A to be changed. The complex amplitude A1 of the branched light X1 and the complex amplitude A2 of the branched light X2 are expressed, respectively, as follows:

$$A1 = A_1(V_1) * \exp[i\theta_1(V_1)] \quad (1)$$

$$A2 = A_2(V_2) * \exp[i\theta_2(V_2)] \quad (2)$$

The branched light X1 and the branched light X2 are coupled at the output side of the MZ interferometer, and coupled light is output as output light X3. The complex amplitude A3 of the output light X3 is expressed by the following formula (3).

$$A3 = A_{out} * \exp[i\theta_{out}] \quad (3)$$

$A_{out}$ and $\theta_{out}$ are expressed, as follows:

$$A_{out} = \sqrt{(A_1^2 + A_2^2 + A_1 * A_2 \cos(\theta_1 - \theta_2))}$$

$$\tan\theta_{out} = (A_1 \sin\theta_1 + A_2 \sin\theta_2)/(A_1 \cos\theta_1 + A_2 \cos\theta_2)$$

When the equation of $A_1 = A_2$ holds, it is expressed as follows:

$$\tan\theta_{out} = (2\sin((\theta_1+\theta_2)/2)*\cos((\theta_1-\theta_2)/2))/(2\cos((\theta_1+\theta_2)/2)*\cos((\theta_1-\theta_2)/2))$$

In addition, when $\cos((\theta_1-\theta_2)/2) \neq 0$, it is expressed as follows:

$$\tan\theta_{out} = \sin((\theta_1+\theta_2)/2)/\cos((\theta_1+\theta_2)/2) = \tan((\theta_1+\theta_2)/2)$$

As expressed by the above-described formulae, the complex amplitude A3 of the output light X3 depends on the phase $\theta_1$ and the amplitude $A_1$ of the branched light X1, and on the phase $\theta_2$ and the amplitude $A_2$ of the branched light X2.

In the MZ type optical modulator 300 illustrated in FIG. 5, when the applied voltage of the MZ_I (MZ_Q) is changed, the extinction ratio (adjusting parameter (A)) of each MZ interferometer is changed. As mentioned above, because the output light of the MZ_I and the output light of the MZ_Q are inputted into the MZ_M, the phase and power of the output light of the MZ_I (MZ_Q), that is, the input light of the MZ_M, is also changed. Consequently, even though the applied voltage of the MZ_M is not changed, the power balance between the I-component and the Q-component (adjusting parameter (B)) and the phase difference between the I-component and the Q-component (adjusting parameter (C)) are changed.

In contrast, when the applied voltages of the DC electrodes (MP1 and MP2) of the MZ_M are changed, the power of the branched light inputted from the MZ_I (MZ_Q) is changed. As a result, not only the power balance between the I-component and the Q-component (adjusting parameter (B)) of the output light of the MZ_M is changed, but also the phase difference between the I-component and the Q-component (adjusting parameter (C)) is changed.

As mentioned above, in the MZ interferometer type optical modulator such as the semiconductor optical modulator in which the phase or amplitude of the propagating light varies due to application of the voltage, three adjusting parameters can be changed by changing the applied voltage of one MZ interferometer only. Consequently, in order to optimize three adjusting parameters simultaneously, complex control is required in which the interference states in all the MZ interferometers are taken into consideration. Here, three adjusting parameters consist of (A) the extinction ratio of each MZ interferometer, (B) the power balance between the I-component and the Q-component, and (C) the phase difference between the I-component and the Q-component that are described above.

FIG. 7 illustrates the configuration of a related optical modulating apparatus 500 with the MZ type optical modulator. The related optical modulating apparatus 500 includes an MZ type optical modulator 510, an optical monitor 520, a controller 530, a voltage application part 540, a signal input part 550, and a laser light source 560. The MZ type optical modulator 510 includes an MZ interferometer 511, a DC electrode 512, and an RF electrode 513, and the phase or the amplitude of the propagating light is changed due to application of the voltage.

Next, the operation of the related optical modulating apparatus 500 will be described.

Input light 51 is inputted into the MZ type optical modulator 510 from the laser light source 560. The voltage application part 540 applies a DC voltage to the DC electrode 512 included in the MZ type optical modulator 510, and the signal input part 550 supplies an input signal 52 to the RF electrode 513. This causes the MZ type optical modulator 510 to modulate the input light 51, and the MZ type optical modulator 510 outputs output light 53. Part of the output light 53 is output as branched light 54. The optical monitor 520 monitors the branched light 54. The controller 530 controls the voltage application part 540 as needed based on monitor information obtained from the optical monitor 520.

The configuration of the MZ type optical modulator 510 is similar to that of the MZ type optical modulator 300 illustrated in FIG. 5. The output light of the MZ_I interferes with the output light of the MZ_Q in the MZ_M that constitutes the MZ interferometer 511. In order that the MZ type optical modulator 510 may output the output light 53 with good signal characteristics, it is necessary to satisfy the above-mentioned three drive conditions. That is to say, it is necessary to satisfy the conditions that (a) the extinction ratio of the output light of the MZ_I and the extinction ratio of the output light of the MZ_Q are high, that (b) the power of the I-component is equal to the power of the Q-component, and that (c) the phase difference between the I-component and the Q-component is equal to 90 degrees.

In order to optimize these drive conditions, that is, the extinction ratio, the power balance between the I-component and the Q-component, and the phase difference between the I-component and the Q-component, a combination of the voltages applied to three MZ interferometers, the MZ_I, the MZ_Q, and the MZ_M, is determined based on monitor information obtained from the optical monitor 520.

The operation will be described that is performed to adjust the extinction ratio of the MZ interferometer (MZ_I) corresponding to the I-component in a state where the power of the I-component is equal to the power of the Q-component, and the phase difference between the I-component and the Q-component is set at 90 degrees. As mentioned above, the extinction ratio of the output light of the MZ_I can be adjusted by changing the voltages applied to the DC electrodes (IP1 and IP2) of the MZ_I. At this time, the power and phase of the output light of the MZ_I are changed simultaneously (see formula (3)). Consequently, the power balance between the I-component and the Q-component in the MZ_M is changed, and the adjusting parameter that "(C) the phase difference between I output light and Q output light is equal to 90 degrees" is no longer satisfied that is included in the above-mentioned three adjusting parameters.

That is to say, when the applied voltage of one MZ interferometer is changed, the variation has an impact on the other MZ interferometer; as a result, the above-mentioned three adjusting parameters (A), (B), and (C) are changed. Accordingly, it is necessary to control three MZ interferometers simultaneously in order to optimize three adjusting parameters (A), (B), and (C).

As described above, there has been the problem that complex control is required to optimize the signal characteristics of an optical modulator with a plurality of Mach-Zehnder interferometers.

An example advantage according to the invention is that it is possible to optimize the signal characteristic of the optical modulator with a plurality of Mach-Zehnder interferometers by simple control, according to the optical modulating apparatus and the method for controlling the optical modulator of the present invention.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The invention claimed is:

1. An optical modulating apparatus, comprising:
   an optical modulator including a plurality of Mach-Zehnder interferometers each of which including a pair of waveguides;
   a storage configured to store waveguide characteristic information indicating a relationship between a bias electrical signal applied to a waveguide of the pair of waveguides and an optical characteristic of the waveguide;
   a calculation part configured to calculate, depending on a variation in the bias electrical signal applied to the waveguide included in one Mach-Zehnder interferometer of the plurality of Mach-Zehnder interferometers, a correction electrical signal applied to the waveguide included in the other Mach-Zehnder interferometer based on the waveguide characteristic information; and
   a signal application part configured to apply the correction electrical signal to the waveguide included in the other Mach-Zehnder interferometer.

2. The optical modulating apparatus according to claim 1,
wherein the calculation part calculates an optical characteristic variation of the waveguide due to a variation in the bias electrical signal based on the waveguide characteristic information,
calculates a characteristic variation of output light of the one Mach-Zehnder interferometer due to the optical characteristic variation of the waveguide, and
determines the correction electrical signal based on the waveguide characteristic information so as to cancel the characteristic variation.

3. The optical modulating apparatus according to claim 1, further comprising
a laser light source configured to emit a laser carrier wave to be inputted into the optical modulator, and
a monitor configured to monitor part of output light of the optical modulator and output a monitor signal,
wherein the signal application part includes
a direct current electrical signal application part configured to apply a direct current electrical signal including the bias electrical signal and the correction electrical signal to the waveguide,
a data signal input part configured to apply a data electrical signal to the waveguide, and
a controller configured to control the direct current electrical signal application part so as to apply the bias electrical signal to the waveguide included in the one Mach-Zehnder interferometer and apply the correction electrical signal to the waveguide included in the other Mach-Zehnder interferometer, and
the calculation part generates the waveguide characteristic information based on the monitor signal and stores the waveguide characteristic information having been generated in the storage.

4. The optical modulating apparatus according to claim 3, wherein the plurality of Mach-Zehnder interferometers include
a first Mach-Zehnder interferometer including a first waveguide and a second waveguide,
a second Mach-Zehnder interferometer including a third waveguide and a fourth waveguide, and
a third Mach-Zehnder interferometer including a fifth waveguide to guide first interfering light output from the first Mach-Zehnder interferometer and a sixth waveguide to guide second interfering light output from the second Mach-Zehnder interferometer, and
the storage stores the waveguide characteristic information on each of the first waveguide, the second waveguide, the third waveguide, the fourth waveguide, the fifth waveguide, and sixth waveguide.

5. The optical modulating apparatus according to claim 4, wherein the first Mach-Zehnder interferometer includes a first high-frequency electrode to apply the data electrical signal to the first waveguide, a first direct current electrode to apply the direct current electrical signal to the first waveguide, a second high-frequency electrode to apply the data electrical signal to the second waveguide, and a second direct current electrode to apply the direct current electrical signal to the second waveguide,
the second Mach-Zehnder interferometer includes a third high-frequency electrode to apply the data electrical signal to the third waveguide, a third direct current electrode to apply the direct current electrical signal to the third waveguide, a fourth high-frequency electrode to apply the data electrical signal to the fourth waveguide, and a fourth direct current electrode to apply the direct current electrical signal to the fourth waveguide, and
the third Mach-Zehnder interferometer includes a fifth direct current electrode to apply the direct current electrical signal to the fifth waveguide and a sixth direct current electrode to apply the direct current electrical signal to the sixth waveguide.

6. The optical modulating apparatus according to claim 1, wherein the optical characteristic includes a phase and a loss of guided light propagating through the waveguide.

7. A method for controlling an optical modulator, the optical modulator including a plurality of Mach-Zehnder interferometers including a pair of waveguides, comprising:
obtaining waveguide characteristic information indicating a relationship between a bias electrical signal applied to a waveguide of the pair of waveguides and an optical characteristic of the waveguide;
calculating a correction electrical signal based on the waveguide characteristic information depending on a variation in the bias electrical signal applied to the waveguide included in one Mach-Zehnder interferometer of the plurality of Mach-Zehnder interferometers, the correction electrical signal being applied to the waveguide included in other Mach-Zehnder interferometer; and
applying the correction electrical signal to the waveguide included in the other Mach-Zehnder interferometer.

8. The method for controlling the optical modulator according to claim 7,
wherein the calculating of the correction electrical signal includes
calculating an optical characteristic variation of the waveguide due to a variation in the bias electrical signal based on the waveguide characteristic information,
calculating a characteristic variation of output light of the one Mach-Zehnder interferometer due to the optical characteristic variation of the waveguide, and
determining the correction electrical signal based on the waveguide characteristic information so as to cancel the characteristic variation.

9. The method for controlling the optical modulator according to claim 7,
wherein the obtaining of the waveguide characteristic information includes generating the waveguide characteristic information by monitoring part of output light of the optical modulator.

10. The method for controlling the optical modulator according to claim 7,
wherein the optical characteristic includes a phase and a loss of guided light propagating through the waveguide.

11. The optical modulating apparatus according to claim 2, further comprising
a laser light source configured to emit a laser carrier wave to be inputted into the optical modulator, and
a monitor configured to monitor part of output light of the optical modulator and output a monitor signal,
wherein the signal application part includes
a direct current electrical signal application part configured to apply a direct current electrical signal including the bias electrical signal and the correction electrical signal to the waveguide,
a data signal input part configured to apply a data electrical signal to the waveguide, and a controller configured to control the direct current electrical signal application part so as to apply the bias electrical signal to the waveguide included in the one Mach-Zehnder interferometer and apply the correction electrical signal to the waveguide included in the other Mach-Zehnder interferometer, and the calculation part generates the waveguide characteristic information based on the monitor signal and stores the waveguide characteristic information having been generated in the storage.

12. The optical modulating apparatus according to claim 11,
wherein the plurality of Mach-Zehnder interferometers include
a first Mach-Zehnder interferometer including a first waveguide and a second waveguide,
a second Mach-Zehnder interferometer including a third waveguide and a fourth waveguide, and
a third Mach-Zehnder interferometer including a fifth waveguide to guide first interfering light output from the first Mach-Zehnder interferometer and a sixth waveguide to guide second interfering light output from the second Mach-Zehnder interferometer, and
the storage stores the waveguide characteristic information on each of the first waveguide, the second waveguide, the third waveguide, the fourth waveguide, the fifth waveguide, and sixth waveguide.

13. The optical modulating apparatus according to claim 12,
wherein the first Mach-Zehnder interferometer includes a first high-frequency electrode to apply the data electrical signal to the first waveguide, a first direct current electrode to apply the direct current electrical signal to the first waveguide, a second high-frequency electrode to apply the data electrical signal to the second waveguide, and a second direct current electrode to apply the direct current electrical signal to the second waveguide,
the second Mach-Zehnder interferometer includes a third high-frequency electrode to apply the data electrical signal to the third waveguide, a third direct current electrode to apply the direct current electrical signal to the third waveguide, a fourth high-frequency electrode to apply the data electrical signal to the fourth waveguide, and a fourth direct current electrode to apply the direct current electrical signal to the fourth waveguide, and the third Mach-Zehnder interferometer includes a fifth direct current electrode to apply the direct current electrical signal to the fifth waveguide and a sixth direct current electrode to apply the direct current electrical signal to the sixth waveguide.

14. The optical modulating apparatus according to claim 2,
wherein the optical characteristic includes a phase and a loss of guided light propagating through the waveguide.

15. The optical modulating apparatus according to claim 3,
wherein the optical characteristic includes a phase and a loss of guided light propagating through the waveguide.

16. The optical modulating apparatus according to claim 4,
wherein the optical characteristic includes a phase and a loss of guided light propagating through the waveguide.

17. The optical modulating apparatus according to claim 5,
wherein the optical characteristic includes a phase and a loss of guided light propagating through the waveguide.

18. The method for controlling the optical modulator according to claim 8,
wherein the obtaining of the waveguide characteristic information includes generating the waveguide characteristic information by monitoring part of output light of the optical modulator.

19. The method for controlling the optical modulator according to claim 8,
wherein the optical characteristic includes a phase and a loss of guided light propagating through the waveguide.

20. The method for controlling the optical modulator according to claim 9,
wherein the optical characteristic includes a phase and a loss of guided light propagating through the waveguide.

* * * * *